US012197868B2

(12) United States Patent
Cohen et al.

(10) Patent No.: US 12,197,868 B2
(45) Date of Patent: Jan. 14, 2025

(54) USING VIDEO CLIPS AS DICTIONARY USAGE EXAMPLES

(71) Applicant: Google LLC, Mountain View, CA (US)

(72) Inventors: Tal Cohen, Atlit (IL); Tal Snir, Ramat Hasharon (IL); Sivan Eiger, Tel Aviv (IL); Zahi Akiva, Ra'anana (IL); Gadi Ben Amram, Tel Aviv (IL); Ran Dahan, Tel Aviv (IL); Sasha Goldshtein, Tel Aviv (IL); Yossi Matias, Tel Aviv (IL); Shoji Ogura, Tokyo (JP)

(73) Assignee: GOOGLE LLC, Mountain View, CA (US)

( * ) Notice: Subject to any disclaimer, the term of this patent is extended or adjusted under 35 U.S.C. 154(b) by 225 days.

(21) Appl. No.: 17/774,460

(22) PCT Filed: Nov. 4, 2019

(86) PCT No.: PCT/US2019/059721
§ 371 (c)(1),
(2) Date: May 4, 2022

(87) PCT Pub. No.: WO2021/091526
PCT Pub. Date: May 14, 2021

(65) Prior Publication Data
US 2022/0405478 A1 Dec. 22, 2022

(51) Int. Cl.
*G10L 15/20* (2006.01)
*G06F 3/0488* (2022.01)
(Continued)

(52) U.S. Cl.
CPC .......... *G06F 40/295* (2020.01); *G06F 3/0488* (2013.01); *G06F 16/7834* (2019.01);
(Continued)

(58) Field of Classification Search
CPC ............................. G10L 15/187; G10L 15/20
See application file for complete search history.

(56) References Cited

U.S. PATENT DOCUMENTS

2002/0069140 A1 6/2002 Tang
2006/0183089 A1 8/2006 Gleissner et al.
(Continued)

FOREIGN PATENT DOCUMENTS

CN 105183897 12/2015
CN 107293286 10/2017
(Continued)

OTHER PUBLICATIONS

Zhu, et al. "ViVo: Video-Augmented Dictionary for Vocabulary Learning," CHI 2017. (Year: 2017).*
(Continued)

*Primary Examiner* — Feng-Tzer Tzeng
(74) *Attorney, Agent, or Firm* — DORITY & MANNING P.A.

(57) ABSTRACT

Implementations are provided for automatically mining corpus(es) of electronic video files for video clips that contain spoken utterances that are suitable usage examples to accompany or compliment dictionary definitions. These video clips may then be associated with target n-grams in a searchable database, such as a database underlying an online dictionary. In various implementations, a set of candidate video clips in which a target n-gram is uttered in a target context may be identified from a corpus of electronic video files. For each candidate video clip of the set, pre-existing manual subtitles associated with the candidate video clip may be compared to text generated based on speech recognition processing of an audio portion of the candidate video
(Continued)

clip. Based at least in part on the comparing, a measure of suitability as a dictionary usage example may be calculated for the candidate video clip.

19 Claims, 5 Drawing Sheets

(51) Int. Cl.
*G06F 16/783* (2019.01)
*G06F 40/295* (2020.01)
*G06V 20/40* (2022.01)
*G06V 40/10* (2022.01)
*G06V 40/20* (2022.01)
*G10L 15/197* (2013.01)

(52) U.S. Cl.
CPC .............. *G06V 20/40* (2022.01); *G06V 40/10* (2022.01); *G06V 40/20* (2022.01); *G10L 15/197* (2013.01); *G10L 15/20* (2013.01)

(56) References Cited

U.S. PATENT DOCUMENTS

| | | | |
|---|---|---|---|
| 2009/0043581 A1* | 2/2009 | Abbott | G10L 15/187 704/254 |
| 2009/0177468 A1* | 7/2009 | Yu | G10L 15/02 704/226 |
| 2012/0166365 A1 | 6/2012 | Tur et al. | |
| 2013/0120654 A1 | 5/2013 | Kuspa | |
| 2017/0061316 A1* | 3/2017 | Tur | G06N 7/01 |

FOREIGN PATENT DOCUMENTS

| | | |
|---|---|---|
| CN | 108280155 | 7/2018 |
| CN | 108984722 | 12/2018 |
| JP | 2012043422 | 3/2012 |
| WO | WO 2005/020579 | 3/2005 |
| WO | WO 2019/108257 | 6/2019 |

OTHER PUBLICATIONS

Zhu, et al., "ViVo: Video-Augmented Dictionary for Vocabulary Learning," CHI 2017 (see previous Office action attachment). (Year: 2017).*
Zhu, et al., "ViVo: Video-Augmented Dictionary for Vocabulary Learning," CHI 2017 (see previous Office action for attached copy). (Year: 2017).*
International Preliminary Report on Patentability for Application No. PCT/US2019/059721, mailed May 10, 2022, 6 pages.
International Search Report on Written Opinion for Application No. PCT/US2019/059721, mailed Jun. 17, 2020, 9 pages.
Zhu et al., "ViVo: Video-Augmented Dictionary for Vocabulary Learning", Proceedings of the 2017 CHI Conference on Human Factors in Computing Systems, 2017, pp. 5568-5579.
Machine Translated Chinese Search Report Corresponding to Application No. 2019801033164 on Sep. 24, 2024.

* cited by examiner

USING VIDEO CLIPS AS DICTIONARY USAGE EXAMPLES

PRIORITY CLAIM

This application is based upon and claims the right of priority under 35 U.S.C. § 371 to International Application No. PCT/US2019/059721 filed on Nov. 4, 2019. Applicant claims priority to and the benefit of each of such applications and incorporates all such applications herein by reference in their entirety.

BACKGROUND

In addition to definitions, dictionaries often provide other information about words and/or phrases (herein referred to as "n-grams"), including but not limited to synonyms, antonyms, phonetic information, etymological information, and/or usage examples. Usage examples in particular may be highly beneficial to individuals (sometimes referred to herein as "users") who are trying to understand how a given word or phrase is used in various contexts. Usage examples provided in conventional dictionaries, both in paper and electronic form, are often excerpted from literature, newspapers, and so forth.

Whether electronic or printed on paper, these usage examples are typically provided in print form, which may not be helpful in understanding some aspects of the word or phrase, such as its pronunciation (e.g., in general or regionally). Moreover, with users increasingly obtaining information, including dictionary definitions of words/phrases, by way of spoken human-to-computer dialogs with automated assistants, print usage examples may have various limitations. For example, text-to-speech ("TTS") processing of a printed usage example may generate audible output of the word or phrase being used in a context, but the computer-generated speech may not necessarily capture the correct pronunciation or other subtle mannerisms that are often used when the word/phrase is spoken by a human being.

Electronic video files may be associated with (e.g., as metadata) text data that conveys spoken dialog and other sound contained in the electronic video files. These textual data are often used to present subtitles and/or captions on a screen while the video file is being played. Subtitles may include spoken dialog, whereas captions may include both dialog and also may include other sounds contained in video files, such as music, sound effects, etc. Put another way, subtitles only convey what people in videos say, whereas captions (sometimes referred to as "closed captions") also convey information about non-verbal sounds in videos, such as "dramatic music playing," "car door slams," "birds chirping," and so forth. For purposes of the present disclosure, the terms "subtitles" and "captions" will be used interchangeably to refer to printed text that conveys spoken dialog contained in an electronic video file and/or video clip.

SUMMARY

The present disclosure is generally directed to methods, apparatus, and computer-readable media (transitory and non-transitory) for automatically mining corpus(es) of electronic video files for video clips that contain spoken utterances that are suitable usage examples to accompany or compliment dictionary definitions. These video clips may then be associated with target n-grams in a searchable database, such as a database underlying an online dictionary. As used herein, a "video clip" or "video segment" may be include an entire electronic video file or a portion of the electronic video file. For example, a video clip that contains an utterance of a target n-gram may be excised or extracted from a longer electronic video file that contains other extraneous content that isn't relevant to the target n-gram.

In some implementations, subtitles associated with electronic video files may be used to identify video files or portions thereof that contain candidate usage examples for target n-grams. Additionally or alternatively, in some implementations, automated speech recognition ("ASR") processing (alternatively referred to as "speech-to-text", or "STT", processing) may be used to generate a transcript of spoken dialog in an electronic video file or video clip. These transcripts may be used to identify video files or portions thereof that contain candidate usage examples for target n-grams.

As noted above, electronic video files often may contain substantial amounts of irrelevant information that is not needed to generate a dictionary usage example. Accordingly, a portion of the video that contains an utterance of a target n-gram may be excised as a video clip. The portion-to-be-excised may be identified using various different techniques and/or heuristics. For example, one or more full spoken sentences that contain the target n-gram may be identified, e.g., using natural language processing and/or audio processing (e.g., to detect pauses, timing, etc.), and the portion of the video clip that contains at least the identified one or more full sentences may be excised for potential use as a dictionary usage example. In implementations in which subtitles (or an ASR-generated transcript) of the video contain punctuation (e.g., capital letters, periods, commas, etc.), that punctuation may likewise be used to delineate full sentence(s) in which the target n-gram was spoken.

Just because a video clip contains a target n-gram does not mean it is suitable for a dictionary usage example. The video clip may be noisy or low quality, either of which can make the spoken dialog difficult to understand. Or, a video clip may contain explicit content that makes it unsuitable for some viewers, and consequently, unsuitable for a dictionary usage example. Moreover, many n-grams have multiple meanings or senses. The one-gram "test" can be a noun or a verb, and so a video clip in which "test" is used as a noun may not be suitable as a usage example for the verb definition of "test."

Even among video clips that lack these shortcomings, some video clips may be more suitable than others as dictionary usage examples. Accordingly, in various implementations, one or more video characteristics and/or other signals may be analyzed to determine a measure of "suitability as a dictionary usage example" (or "SDUE") of a video clip. Video clips may be selected, e.g., for association with target n-grams in a searchable database and/or for output to an inquiring user, based on their corresponding measures of SDUE. In various implementations, measures of SDUE may be calculated for entire electronic video files, for portions of electronic video files, and/or for video clips excised from electronic video files.

Generally speaking, videos with spoken dialog that is more likely to be understandable to a viewer may be better suited for use as dictionary usage examples. Accordingly, various characteristics of videos may be used to determine measures of SDUE. The more spoken dialog in a video exhibits suitable cadence, pronunciation, annunciation, etc., the more likely it will be suitable as a dictionary usage example.

In some implementations, a measure of SDUE for a video may be determined based on a comparison of subtitles associated with the video (e.g., preexisting, manually generated) and transcript generated by performing ASR processing on the video. The subtitles and the ASR-generated transcript may be compared to each other to determine a similarity (or dissimilarity) measure. By using ASR to obtain text from audio associated with a video and comparing that text to existing subtitles, the text comparison can effectively be used to determine the quality of the audio signal. That is, the quality of the text output from ASR processing is directly related to the quality of the audio signal processed by ASR to generate the text. As such, comparing text output of ASR in this way allows the quality of the audio signal to be analyzed. Greater similarity between the two suggests that dialog in the video is clear, and will more likely be understandable to a viewer than a different video for which subtitles and an ASR-generated transcript deviate greatly. A similarity measure between subtitles and an ASR-generated transcript may be determined using various techniques, such as edit distance between the two, distances between embeddings of the two in embedding space, differences between bags-of-words generated for each, etc.

A video clip in which a mouth of the person who speaks the target n-gram is visible, e.g., because the person is facing the camera or at least is in the camera's field of view, may be more suitable as a dictionary usage example than, say, a video clip in which the speaker's mouth is not visible (e.g., they are off-camera as a narrator). Accordingly, in some implementations, a detected gaze and/or pose of a speaker while the speaker uttered the target n-gram may be considered in determining a measure of SDUE for a video.

Videos with less background noise (e.g., traffic, music, etc.) may be more likely to be understandable, and therefore, more suitable for dictionary usage examples. Additionally, a video in which a speaker speaks slowly and/or clearly may be more likely to be understandable, and therefore, more suitable for dictionary usage examples, than another video in which the speaker speaks quickly and/or unclearly, Accordingly, in some implementations, a detected background noise level of the candidate video clip or a measured rate of speech uttered in the video clip may be considered in determining a measure of SDUE.

Other signals besides those relating to sound and/or speech quality may also be considered in various implementations. Highly popular videos may be perceived as more credible and/or higher quality than less popular or obscure videos, and therefore may be better suited for harvesting of video usage examples. This may be because, for instance, people depicted in popular videos may themselves tend to be popular and/or perceived as credible. Or, it may because popular videos are more likely to have been seen by users before, and as explained below, repeated viewings can be beneficial for learning words. Accordingly, in some implementations, a popularity measure of the video clip may be considered in determining a measure of SDUE.

On an individual level, a video that a person has seen before may be more effective in teaching that person about a target n-gram than a previously-unviewed video. Accordingly, in some implementations, a determination that a given user has viewed the video clip previously may be considered in determining a measure of SDUE. Also on an individual level, characteristics of the individual, such as their location, demographics, gender, age, etc., may be used to determine a measure of SDUE of a video. Suppose a user is located in a particular geographic region known for a particular accent, dialect, or for particular colloquialisms. In some implementations, video clips may be promoted (e.g., be assigned higher measures of SDUE) that are more likely to include (e.g., based on filming location, story setting, etc.) utterances of the target n-gram in the same region-specific accent or dialect.

In some implementations in which a single electronic video file contains multiple instances of a target n-gram being uttered, multiple video clips may be identified (or even excised), each containing at least one instance of the target n-gram. These multiple video clips may then be used to calculate measures of SDUE relative to each other, which can then be used to select which will be used as a dictionary usage example. In some such implementations, the most popular portion of the electronic video file—e.g., the portion viewed by the most people—may receive a higher measure of SDUE than a less popular/viewed portion of the video.

As mentioned previously, many n-grams have multiple meanings. In order for a video dictionary usage example to be effective, it should include the n-gram in the proper context, i.e., a target context for which a user wishes to learn more about the n-gram. Various techniques may be used to determine a context of an uttered n-gram in a video clip. For example, when identifying a set of candidate video clips for consideration as a dictionary usage example, natural language processing may be performed on text associated with electronic video files from which the clips are excised to identify those in which the target n-gram is uttered in a target context. Additionally or alternatively, in some implementations, text embeddings may be generated from text associated with the electronic video files. In some such implementations, these embeddings may be applied as input across a trained machine learning model to generate output. The output may be used to identify the set of candidate video clips in which the target n-gram is uttered in the target context.

In some implementations, a method may be implemented using one or more processors, and may include: identifying, from a corpus of electronic video files, a set of candidate video clips, wherein a target n-gram is uttered in a target context in each candidate video clip of the set; for each candidate video clip of the set: comparing pre-existing manual subtitles associated with the candidate video clip to text that is generated based on speech recognition processing of an audio portion of the candidate video clip, and based at least in part on the comparing, calculating a measure of suitability as a dictionary usage example for the candidate video clip; selecting one or more of the candidate video clips from the set of candidate video clips based on the measures of suitability as dictionary usage examples; and associating the one or more selected video clips with the target n-gram in a searchable database.

In various implementations, the identifying may include performing natural language processing on text associated with the electronic video files to identify those in which the target n-gram is uttered in the target context. In various implementations, the identifying may include applying text embeddings generated from text associated with the electronic video files as input across a trained machine learning model to generate output, wherein the output is used to identify the set of candidate video clips in which the target n-gram is uttered in the target context.

In various implementations, the calculating may be further based on a detected gaze of a speaker in the candidate video clip while the speaker uttered the target n-gram in the target context. In various implementations, the calculating may be further based on a detected pose of a speaker in the candidate video clip while the speaker uttered the target n-gram in the target context, or whether a mouth of the speaker is visible in the video clip. In various implementations, the calculating may be further based on a detected background noise level of the candidate video clip or a measured speech rate of speech uttered in the candidate video clip. In various implementations, the calculating may be further based on a popularity measure of the video clip.

In various implementations, the calculating may be further based on a determination that a given user who seeks information about the target n-gram has viewed the video clip previously. In various implementations, the calculating may be further based on an identity of a speaker of the target n-gram in the video clip or an identity of a crew member who aided in creation of the video clip. In various implementations, the calculating may be further based on an accent of a speaker of the target n-gram in the video clip.

In various implementations, the one or more selected video clips may include a plurality of selected video clips. In various implementations, the method further includes causing the plurality of video clips to play as a sequence, one after another. In various implementations, the method further includes causing a graphical user interface ("GUI") to be rendered on a client device, wherein the GUI is operable by a user to swipe through the plurality of selected video clips. The method may further comprise processing the audio portion of the video clip to generate the text based on speech.

In at least one further aspect there is provided a system comprising one or more processors and memory storing instructions that, in response to execution of the instructions by the one or more processors, cause the one or more processors to: identify, from a corpus of electronic video files, a set of candidate video clips, wherein a target n-gram is uttered in a target context in each candidate video clip of the set; for each candidate video clip of the set: compare pre-existing manual subtitles associated with the candidate video clip to text that is generated based on speech recognition processing of an audio portion of the candidate video clip, and based at least in part on the comparison, calculate a measure of suitability as a dictionary usage example for the candidate video clip; select one or more of the candidate video clips from the set of candidate video clips based on the measures of suitability as dictionary usage examples; and associate the one or more selected video clips with the target n-gram in a searchable database.

The identifying may further include performing natural language processing on text associated with the electronic video files to identify those in which the target n-gram is uttered in the target context. The identifying may further include applying text embeddings generated from text associated with the electronic video files as input across a trained machine learning model to generate output, wherein the output is used to identify the set of candidate video clips in which the target n-gram is uttered in the target context. The calculating may be further based on a detected gaze of a speaker in the candidate video clip while the speaker uttered the target n-gram in the target context. The calculating may be further based on a detected pose of a speaker in the candidate video clip while the speaker uttered the target n-gram in the target context. The calculating may be further based on a detected background noise level of the candidate video clip or a measured speech rate of speech uttered in the candidate video clip.

In a further aspect there is provided a non-transitory computer-readable medium comprising instructions that, in response to execution of the instructions by one or more processors, cause the one or more processors to perform the following operations: identifying, from a corpus of electronic video files, a set of candidate video clips, wherein a target n-gram is uttered in a target context in each candidate video clip of the set; for each candidate video clip of the set: comparing pre-existing manual subtitles associated with the candidate video clip to text that is generated based on speech recognition processing of an audio portion of the candidate video clip, and based at least in part on the comparing, calculating a measure of suitability as a dictionary usage example for the candidate video clip; selecting one or more of the candidate video clips from the set of candidate video clips based on the measures of suitability as dictionary usage examples; and associating the one or more selected video clips with the target n-gram in a searchable database.

Other implementations may include a non-transitory computer readable storage medium storing instructions executable by a processor to perform a method such as one or more of the methods described above. Yet another implementation may include a system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
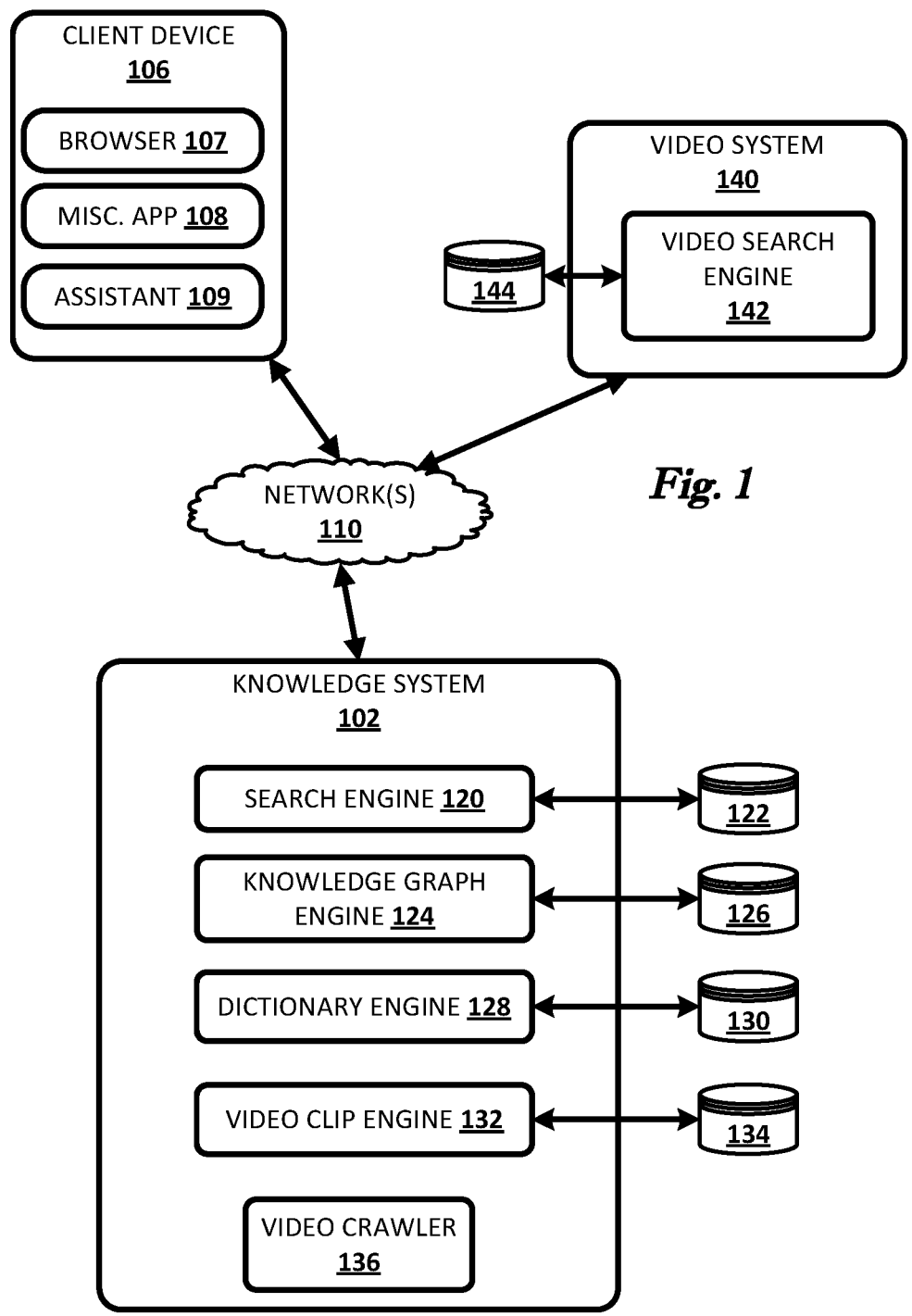
FIG. 1 illustrates an environment in which various aspects of the present disclosure may be implemented, in accordance with various implementations.

FIG. 1 illustrates an environment in which selected aspects of the present disclosure may be implemented. The example environment includes one or more client devices 106 and a knowledge system 102. Knowledge system 102 may be implemented in one or more computers (sometimes referred to as the "cloud") that communicate, for example, through a network. Knowledge system 102 is an example of an information retrieval system in which the systems, components, and techniques described herein may be implemented and/or with which systems, components, and techniques described herein may interface.

One or more users may interact with knowledge system 102 via one or more client devices 106. Each client device 106 may be a computer coupled to the knowledge system 102 through one or more networks 110 such as a local area network (LAN) or wide area network (WAN) such as the Internet. Each client device 106 may be, for example, a desktop computing device, a laptop computing device, a tablet computing device, a mobile phone computing device, a computing device of a vehicle of the user (e.g., an in-vehicle communications system, an in-vehicle entertainment system, an in-vehicle navigation system), a wearable apparatus of the user that includes a computing device (e.g., a watch of the user having a computing device, glasses of the user having a computing device), and so forth. Additional and/or alternative client devices may be provided.

For example, some client devices referred to herein as "assistant devices" may be designed primarily to allow users to interact with a software process referred to herein as an "automated assistant" (also referred to as a "virtual assistant," "voice assistant," "chatbots," etc.) using free-form natural language input. As used herein, free-form input is input that is formulated by a user and that is not constrained to a group of options presented for selection by the user. Assistant devices may take various forms, such as standalone interactive speakers, standalone interactive speakers with touchscreen displays, etc. Other client devices 106 aside from assistant devices may also enable interaction with the automated assistant.

Each client device 106 and knowledge system 102 may include one or more memories for storage of data and software applications, one or more processors for accessing data and executing applications, and other components that facilitate communication over a network. The operations performed by one or more client devices 106 and/or knowledge system 102 may be distributed across multiple computer systems. Knowledge system 102 may be implemented as, for example, computer programs running on one or more computers in one or more locations that are coupled to each other through a network.

Each client device 106 may operate a variety of different applications. In FIG. 1, client device 106 includes a web browser 107, a miscellaneous application 108, and an "assistant" application 109 that enables a user to engage with the aforementioned automated assistant using free-form natural language input. Miscellaneous application 108 may take various forms, including but not limited to an email client, a file transfer client (e.g., FTP, cloud drives, etc.), a proprietary application, a single or multi-lingual dictionary application or applet (e.g., as a feature or plugin for a word processing application), a language translation application, a video playback application, a social networking application, and so forth.

While depicted as part of client device 106, assistant application 109 may be implemented to various degrees on both client device 106 and knowledge system 102. Assistant application 109 may provide an interface to engage with an automated assistant (not depicted). The automated assistant may syntactically and/or semantically process free-form natural language input, such as queries, commands, etc., to determine the user's intent and/or any parameters for fulfilling that intent. The automated assistant may then attempt to fulfill that intent, e.g., by searching for information responsive to the input (e.g., dictionary definitions and/or dictionary usage examples), performing an action responsive to the input (e.g., playing music, turning on a networked appliance), and so forth. In some implementations, the automated assistant may include (on client device and/or on knowledge system 102) various components not depicted in FIG. 1, such as a natural language processor, an entity tagger, a speech-to-text ("STT") component (also referred to as an "automatic speech recognition" or "ASR" component), a text-to-speech ("TTS") component to generate computerized speech output from the automated assistant, and so forth.

In various implementations, knowledge system 102 may include a search engine 120, a knowledge graph engine 124, a dictionary engine 128, a video clip engine 132, and a video crawler 136. One or more of components 120, 124, 128, 132, and/or 136 may be combined with each other, omitted, or implemented outside of knowledge system 102. Moreover, one or more of components 120, 124, 128, 132, and/or 136 may be implemented using any combination of software and hardware, and may be implemented on a single computer or across multiple computers, similar to knowledge system 102 itself.

Search engine 120 may maintain an index 122 for use by knowledge system 102. Search engine 120 may process documents and updates index entries in the index 122, for example, using conventional and/or other indexing techniques. For example, search engine 120 may crawl one or more resources such as the World Wide Web and index documents accessed via such crawling. As another example, search engine 120 may receive information related to one or documents from one or more resources such as web masters controlling such documents and index the documents based on such information. A document is any data that is associated with a document address. Documents include web pages, word processing documents, portable document format (PDF) documents, images, emails, calendar entries, videos, and web feeds, to name just a few. Each document may include content such as, for example: text, images, videos, sounds, embedded information (e.g., meta information and/or hyperlinks); and/or embedded instructions (e.g., ECMAScript implementations such as JavaScript).

In various implementations, knowledge graph engine 124 may maintain an index 126 that stores a knowledge graph that includes nodes that represent various entities and weighted edges that represent relationships between those entities. For example, a "banana" node may be connected (e.g., as a child) to a "fruit" node," which in turn may be connected (e.g., as a child) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge (e.g., representing a child-to-parent relationship) to one or more other nodes, such as a "restaurant" node, a "business" node, a node representing a city and/or state in which the restaurant is located, and so forth. Such a knowledge graph may be built, for instance, by crawling a plurality of databases, online encyclopedias, and so forth, to accumulate nodes presenting entities and edges representing relationships between those entities. In some implementations, the knowledge graph may be populated with information about similarities and/or differences between entities in documents.

Dictionary engine 128 may be configured to perform selected aspects of the present disclosure to enable access to dictionary definitions and other associated information stored in dictionary index 130. For example, and as noted above, dictionary index 130 may store, in addition to definitions, other information about words and/or phrases, including but not limited to synonyms, antonyms, phonetic information, etymological information, and/or usage examples. Usage examples in particular may be highly beneficial to individuals (sometimes referred to herein as "users") who are trying to understand how a given word or phrase is used in various contexts. Usage examples stored in dictionary index 130 (and made accessible by way of dictionary engine 128) may include usage examples excerpted from literature, newspapers, and so forth, as well as audio and/or video usage examples obtained and/or generated using techniques described herein, including techniques performed by video clip engine 132 and/or video crawler 136.

Video clip engine 132 may be configured to store, in video clip index 134, a plurality of video clips that are selected/generated from electronic video files to be made available as dictionary usage examples. For example, video clip engine 132 may store, in video clip index 134 in association with a target n-gram, one or more video clips in which the target n-gram is uttered. In some implementations, video clip engine 132 may be implemented as part of or combined with dictionary engine 128, and video clips that might otherwise be stored in video clip index 134 instead may be stored along with other dictionary information in dictionary index 130.

Video crawler 136 may be configured to crawl various online repositories of electronic video files to identify, obtain, extract, excise, and/or generate video clips that contain utterances of targeted n-grams. These video clips may then be provided to video clip engine 132, which may store them in video clip index as described previously. As used herein, an "electronic video file" may refer to any digital file that stores synchronized visual and audio data. Electronic video files may have various formats, including but not limited to Audio Video Interleave ("AVI"), Flash Video Format ("FLV"), matroska ("MKV"), QuickTime® Movie Format ("MOV"), various versions of Moving Picture Experts Group ("MPEG") such as MPEG-1, MPEG-2, MPEG-3, MPEG-4 (or "MP4"), Windows Media Video ("WMV"), HTML5, WEBM, and so forth.

For example, video crawler 136 may be configured to interface with, and obtain video clips from, one or more video systems 140. Video system 140 may be configured to store, maintain, distribute (e.g., stream), and/or index electronic video files stored in a video file database (or "corpus") 144. In many cases, video system 140 may include a video search engine 142 that is configured to receive a search query, e.g., from browser 107, miscellaneous application(s) 108, and/or automated assistant 109, and search index 144 for responsive video files. In some implementations, video search engine 142 may provide the responsive video files for streaming playback, e.g., in browser 107 or in another application.

Video crawler 136 may be configured to perform selected aspects of the present disclosure to identify, generate, excise/extract, and/or obtain video clips containing utterances of targeted n-grams from electronic video files stored in video repositories such as video file index 144. Video crawler 136 may perform these operations offline (e.g., during downtimes or times of low network traffic, middle of the night, etc.), in batches, and/or on-demand (e.g., in response to a user request for a dictionary usage example or a user request for a dictionary definition). As noted previously, as used herein, a "video clip" or "video segment" may be include an entire electronic video file or a portion of the electronic video file. For example, a video clip that contains an utterance of a target n-gram may be excised or extracted from a longer electronic video file that contains other extraneous content that isn't relative to the target n-gram. The video clips provided by video crawler 136 may be stored in video clip index 134 along with dictionary definitions and/or other dictionary information stored in dictionary index 130. This information may be accessible, e.g., by way of dictionary engine 128 and/or video clip engine 132, as a searchable database, or by any other means.

In various implementations, video crawler 136 may also obtain, from electronic video files it crawls using techniques described herein, textual data associated with electronic video files, e.g., as metadata. These textual data may convey spoken dialog and other sound(s) contained in electronic video files. These textual data are often used to present subtitles and/or captions on a screen while the video file is being played. Subtitles may include spoken dialog, whereas captions may include both dialog and also may include other sounds contained in video files, such as music, sound effects, etc. In many implementations, video crawler may store these textual data in association with the video clips stored in video clip index 134. Consequently, the video clips stored in index 134 may be searchable using these textual data.

In this specification, the term "database" and "index" will be used broadly to refer to any collection of data. The data of the database and/or the index does not need to be structured in any particular way and it can be stored on storage devices in one or more geographic locations. Thus, for example, the indices 122, 126, 130, 134, and 144 may include multiple collections of data, each of which may be organized and accessed differently.

In some implementations, video crawler 136 and/or other components of knowledge system 102 (or even of video system 140 in some cases) may be configured to identify (e.g., obtain, excise, generate), from a corpus of electronic video files such as video file index 144, a set of candidate video clips in which a target n-gram is uttered in a target context. Suppose the target n-gram is "expiate," which means "atone for." Video crawler 136 may search textual data associated with electronic video files in index 144, or may request video search engine 142 to search the textual data, to identify electronic video files that contain an utterance of the target n-gram.

In some implementations, video crawler 136 and/or the automated assistant described previously may perform natural language processing on textual data associated with the electronic video files to identify those in which the target n-gram is uttered in a target context. For example, the one-gram "test" can be a noun or a verb, and so a video clip in which "test" is used as a noun may not be suitable as a usage example for the verb definition of "test." Natural language processing can be used, for instance, to tag n-grams with part-of-speech, so that videos in which "test" is used as a verb can be readily identified, and other videos in which "test" is used as a noun can be excluded from the set of candidate video clips.

Additionally or alternatively, in some implementations, video crawler 136 may apply text embeddings generated from textual data associated with the electronic video files and/or video clips extracted therefrom as input across a trained machine learning model to generate output. The output may then be used to identify the set of candidate video clips in which the target n-gram is uttered in the target context.

For example, a superset of video clips in which the target n-gram is uttered in any context may be identified, e.g., with simple text matching. Then, distances may be determined in embedding space between text embeddings generated from textual data associated with the superset of identified video clips and embeddings generated using the target form of the target n-gram (e.g., noun versus verb). These distances can be used, for instance, to determine which of the identified video clips in the superset should be selected for inclusion in a subset of candidate dictionary usage examples for the target n-gram, and/or to rank the subset of video clips. In some such implementations, a deep neural network may be trained to classify video clips and/or electronic video files based on these text embeddings and/or other text-based signals. The neural network may take various forms, such as a feed-forward neural network, a recurrent neural network ("RNN"), a long short-term memory ("LSTM") network, gated recurrent unit ("GRU") network, a transformer network, and so forth.

In some implementations, for each candidate video clip of the set that includes utterances of the n-gram "expiate," video crawler 136 or another component may compare the textual data, e.g., such as pre-existing manual subtitles associated with the candidate video clip, to text that is generated based on automatic speech recognition ("ASR") processing of an audio portion of the candidate video clip. Based at least in part on the comparing, and/or on other signals described herein in some implementations, video crawler 136 may calculate a measure of suitability as a dictionary usage example ("SDUE") for the candidate video clip. If subtitles of a video clip are determined to be similar to text generated using ASR processing of audio of the video clip, it is likely that the subtitles accurately convey what is uttered in the video clip. Likewise, it also suggests that the audio portion of the video is sufficiently clear and understandable, with suitable cadence, annunciation, pronunciation, etc., that the ASR processing was able to accurately generate text based on spoken utterances in the video clip.

Once measures of SDUE are calculated for the set of candidate video clips, one or more of the candidate video clips may be selected, e.g., by video crawler 136, from the set of candidate video clips based on the measures of SDUE. The selected video clips may be associated with the target-gram, e.g., in a searchable database such as video clip index 134 and/or in dictionary index 130.

Measures of SDUE may be calculated, e.g., by video crawler 136 and/or other components described herein, based on signals and/or factors other than (or in addition to) the above-described comparison of subtitles with ASR processing output. For example, in some implementations, a measure of SDUE may be calculated based on a detected gaze and/or pose of a speaker in a video clip while the speaker utters the target n-gram in the target context. Intuitively, it may be easier for a user to understand a speaker in a video if the user can read the speaker's lips, which would be true if the speaker's gaze is towards the camera, or at least towards a point close to the camera (as is common with interviews). Additionally or alternatively, a pose of the speaker may be considered, for instance, to determine that the speaker is standing still while speaking, which suggests that the speaker may be giving a presentation. In some implementations, if the speaker is detected behind a podium, that may be a positive signal that what the speaker says may receive a relatively strong measure of SDUE.

Even if the user cannot see the speaker's lips, e.g., when the user is engaging with a display-less-assistant device, in a video clip in which the speaker faces the camera, the speaker's utterance of a word may be more likely to be clear and understandable, e.g., because the speaker faced a boom microphone when making the utterance. Additionally or alternatively, a speaker facing the camera may be more likely to make a greater effort to annunciate clearly and/or to speak at an understandable cadence, e.g., because he or she knows what they are saying is going to be viewed later. Also, a speaker facing the camera (and/or standing behind a podium) may be speaking prewritten dialog from a teleprompter, rather than speaking extemporaneously. Prewritten dialog, when read aloud, may be more likely to be understandable and suitable for use as a dictionary usage example.

As another example, the measure of SDUE may be calculated, e.g., by video crawler 136, based on a detected background noise level of the candidate video clip or a measured speech rate of speech uttered in the candidate video clip. If the speaker is in a loud environment such as a music venue or sports arena, the speaker's voice may be more difficult to distinguish from background noise. By contrast, a speaker in a sound studio with no background noise is much more likely to be understandable, and hence, to say something that is suitable for use as a dictionary usage example. And a relatively fast rate of speech may be relatively difficult to understand, particularly compared to a relatively slow rate of speech. Accordingly, video clips featuring dialog spoken at a slow pace may be promoted over video clips featuring faster dialog.

Generally speaking, if a user has viewed a video clip previously, the user is more likely to be able to comprehend and/or contemplate spoken dialog in the video at subsequent viewings, because the user has seen it before. Accordingly, in some implementations, the measure of SDUE for a video clip may be calculated based on a determination that a given user who seeks information about the target n-gram has viewed the video clip previously. Along similar lines, popular video clips in general are more likely to have been viewed by users at large, or at least may be well-known in the current cultural zeitgeist. Consequently, those video clips may be more likely than obscure video clips (e.g., determined from number of views, number of likes, number of comments, etc.) to include dialog that is suitable for use as dictionary usage examples. Even if a particular user hasn't seen a popular video before, they may be aware of it generally, and therefore may be more prepared or "primed" to contemplate and learn from the spoken dialog contained there.

In some implementations, a measure of SDUE of a video clip may be calculated, e.g., by video crawler 136, based on an identity of a speaker of a target n-gram in the video clip, or based on an identity of a crew member or other person who aided in creation of the video clip. Suppose a user is a big fan of a particular actor. The user is more likely to have scene video clips in which the actor utters various dialog. Additionally, the user is more likely to be interested in video clips that feature the actor. Accordingly, if video clips can be found in which that actor utters a target n-gram of interest to the user, those video clips may be promoted over other video clips, e.g., by virtue of being assigned greater measures of SDUE.

In some implementations, a measure of SDUE of a video clip may be calculated, e.g., by video crawler 136, based on an accent or dialect of a speaker of a target n-gram in the video clip. Suppose a user is located in a particular area in which a particular accent or dialect is prevalent. The user may wish to be able to converse as much as possible in the local dialect/accent. Accordingly, video clips in which a target n-gram is spoken in the local accent and/or dialect may be promoted over other videos in different accents and/or dialects.

Figure 2A:
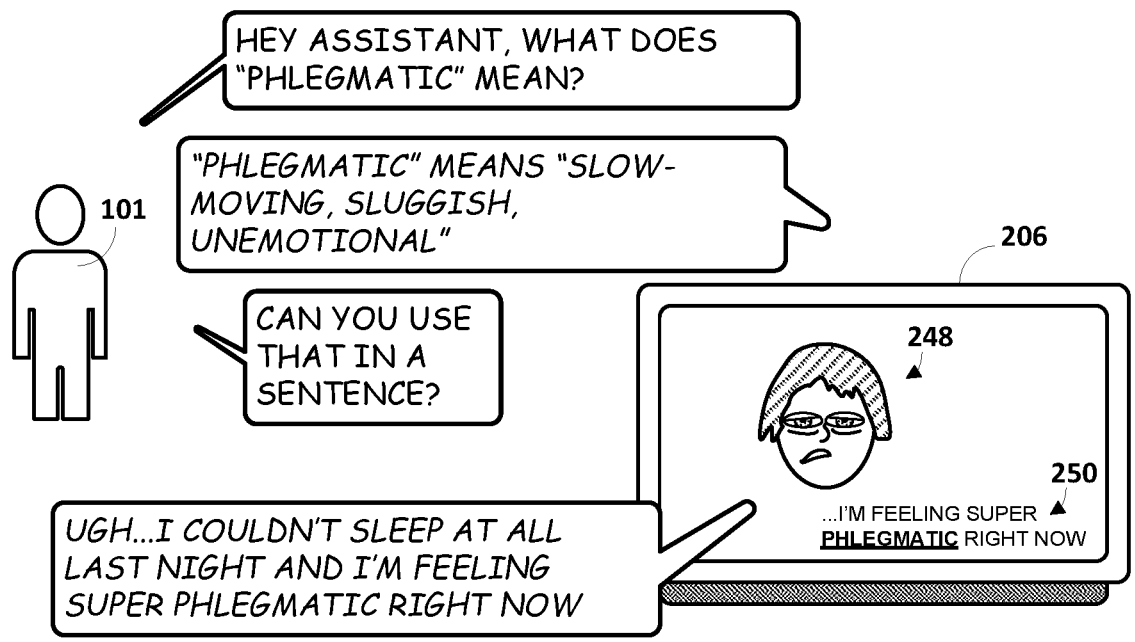
FIGS. 2A, 2B, and 2C depict examples of how video clips may be presented as dictionary usage examples, in accordance with various implementations.
Figure 2B:
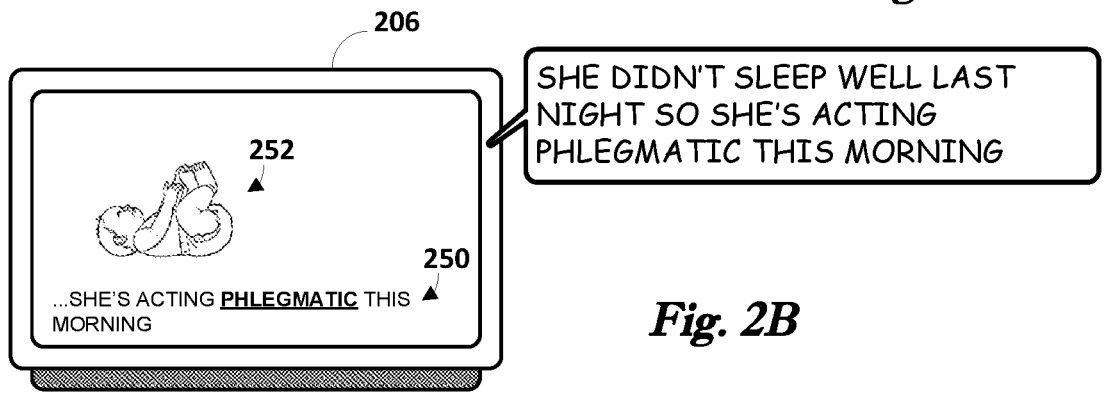
Figure 2C:
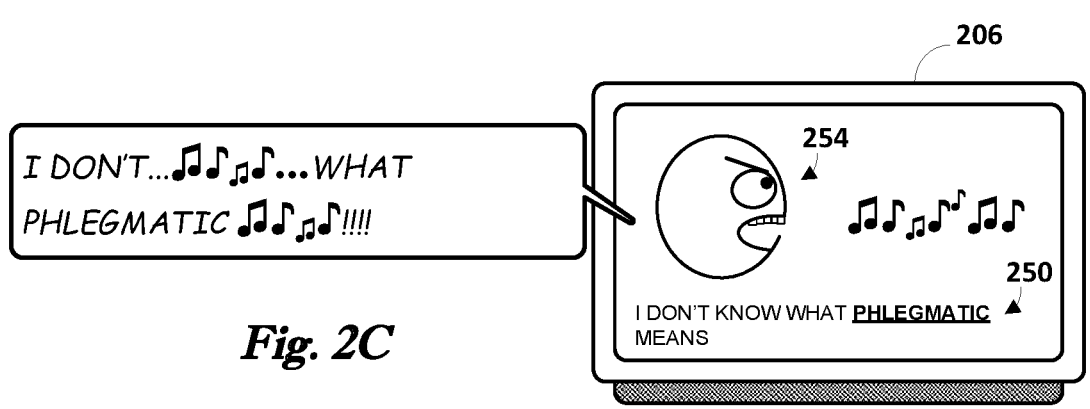

FIGS. 2A-C depict examples of interactions between a user 101 and an automated assistant (not depicted) implemented at least in part on a client device 206. In FIGS. 2A-C, client device 206 takes the form of an assistant device with a speaker, a microphone, and a touchscreen. User 101 may interact with the automated assistant by speaking commands/queries to client device 206, or by interacting with its touchscreen.

In FIG. 2A, user 101 invokes the automated assistant by saying, "Hey Assistant." This may cause the automated assistant to begin "listening" to whatever user 101 says next, e.g., by beginning to perform STT processing on utterances captured by the microphone of client device 206. User 101 then asks, "What does 'phlegmatic' mean?" The automated assistant audibly responds, "'Phlegmatic' means 'slow-moving, sluggish, unemotional'." Although not depicted in FIG. 2A, in some implementations, all or part of the automated assistant's response may be rendered on the touch screen.

User 101 then requests a dictionary usage example for the target n-gram, asking, "can you use that in a sentence?" The automated assistant responds by playing a video clip that is selected in real time or was previously associated with the target n-gram based on a high measure of SDUE by video clip engine 132 or dictionary engine 128. In FIG. 2A, the video clip features a speaker 248 having a weary or tired appearance that utters the sentence, "ugh . . . I couldn't sleep at all last night and I'm feeling super phlegmatic right now." Subtitles 250 are presented contemporaneously with the spoken dialog, and the target n-gram is visually emphasized (and may be selectable as a hyperlink to navigate to another interface). This particular video clip may be presented first because it was assigned a relatively strong measure of SDUE. This relatively strong measure of SDUE may be due to, for instance, the facts that the speaker 248 is facing the camera, the speaker's lips are visible, and because the context in which "phlegmatic" is used makes very clear the meaning of the n-gram. Additionally, there does not appear to be much background noise in the video clip.

In some implementations, a plurality of video clips that contain utterances of the target-n-gram may be played as a sequence, on demand, one after another, until user 101 instructs the automated assistant to stop, or until all available videos or videos that have threshold measures of SDUE have been played. In FIG. 2B, for instance, a second video clip is played in which a baby 252 is depicted, and a speaker off-screen says, "She didn't sleep well last night so she's acting phlegmatic this morning." Again, the context in which the term "phlegmatic" is spoken is closely aligned with and illustrative of its definition. For that reason alone, the video clip of FIG. 2B may also receive a relatively strong measure of SDUE. However, its measure of SDUE may be slightly less strong than that of the video played in FIG. 2A for a variety of reasons. The speaker in FIG. 2B is off-screen, and so their lips are not visible, and there's less likelihood the speaker spoke with the intention of being heard loudly and clearly since they're not intentionally facing the camera or another point adjacent the camera (e.g., as is common in interviews).

In FIG. 2C, a third video clip is played in which a person 254 in a loud environment such as a music venue utters the statement, "I don't know what phlegmatic means!!!" This statement does not provide much, if any, context about the meaning of phlegmatic, and as indicated in the speech balloon, much of what person 254 says is rendered inaudible by background music. Nor is the person 254 facing the camera, although their lips are visible. Additionally, the presence of background music makes it less likely that the person 254 is understandable to a viewer. All these signals may add up to the third video clip being assigned a weaker measure of SDUE than the first and second video clips of FIGS. 2A and 2B, respectively.

Additionally or alternatively, in some implementations, if the speaker is detected as singing the target n-gram, rather than speaking it, that may influence the video clip's measure of SDUE. Singing may be detected, for instance, by detecting a greater variance in pitch of the speaker's voice than is typically observed when a speaker talks normally. Additionally or alternatively, if rhythmatic and/or tonal alignment is detected between the speaker's voice and background music of a video clip, that may evidence that the speaker is singing, rather than speaking, the target n-gram.

Figure 3:
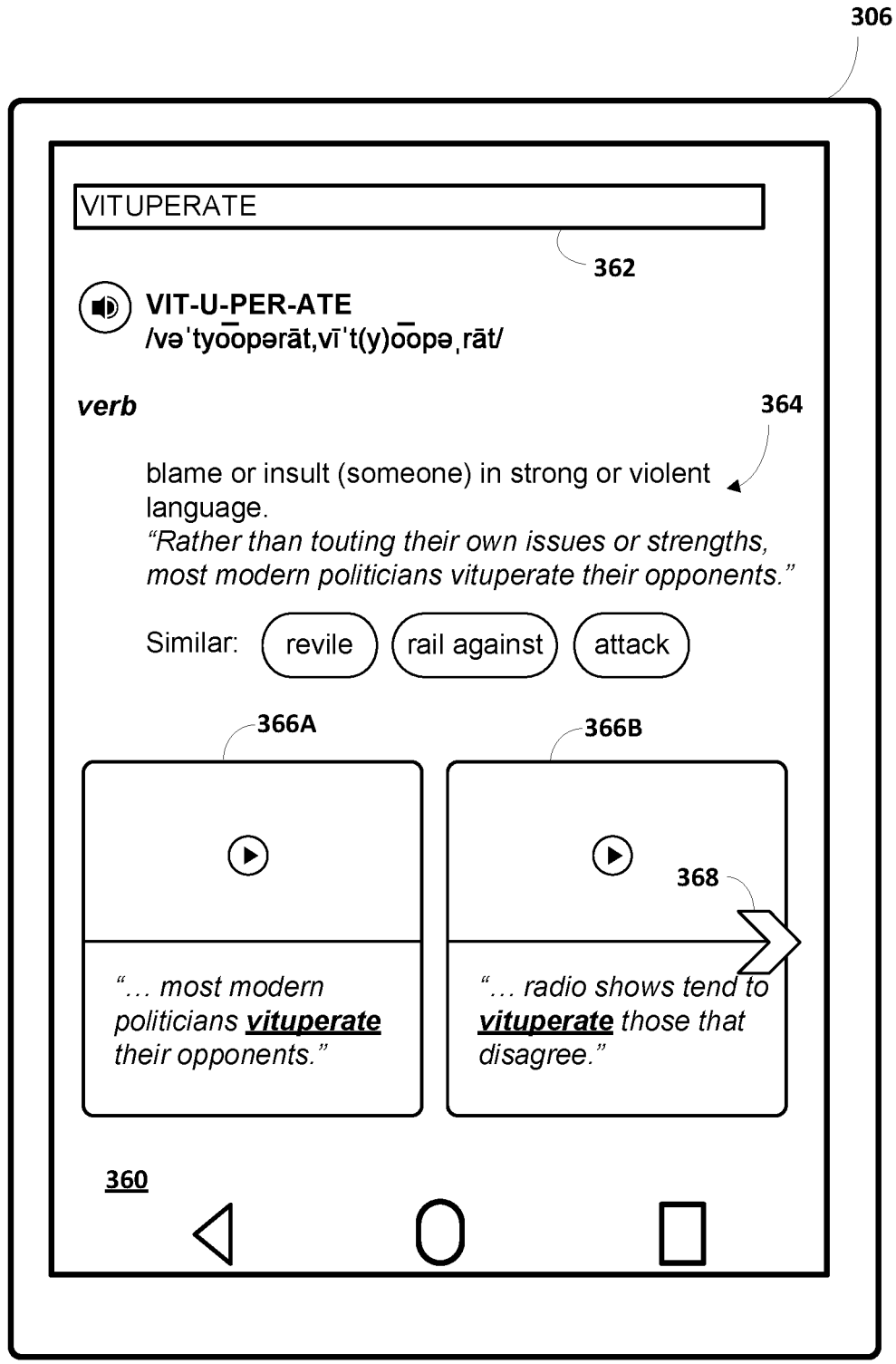
FIG. 3 depicts one example of a graphical interface that may include video clips as dictionary usage examples, in accordance with various implementations.

FIG. 3 depicts an example client device 306 in the form of a smart phone or tablet computer. Client device 306 includes a touchscreen 360. A graphical user interface ("GUI") is rendered on touchscreen 360 that includes a search bar 362. In this example, a user (not depicted) has input into search bar 362 the term "vituperate." Responsive results 364 include a definition of the term, "blame or insult (someone) in strong or violent language." Responsive results 364 also include an electronically-printed usage example, "Rather than touting their own issues or strengths, most modern politicians vituperate their opponents." Also provided as part of responsive results 364 are similar n-grams, such as "revile," "rail against," and "attack."

At bottom, two video clips 366A-B in which the target n-gram "vituperate" is spoken are provided. In various implementations, these video clips may be presented in an order that is selected (e.g., ranked) based on their respective measures of SDUE. For example, first video clip 366A includes the same usage example as the printed example above, and is placed at far left as a way of promoting it over other video clips to the right. In various implementations, a user may swipe through the plurality of video clips 366A-B (and potentially more to the right that are not visible in FIG. 3) and pick individual clips to watch. A graphical element 368 such as an arrow or other similar symbol may be operable to scroll through the videos as well, in some implementations. In some implementations, a user may issue voice commands, such as "next clip" or "scroll right," to scroll through and/or play more video clips. In some implementations, for each video clip, the subtitles are presented below the video, e.g., as the corresponding dialog is spoken. In some implementations, including that of FIG. 3, the target n-gram may be highlighted or otherwise visually distinguished, and in some cases may be operable (e.g., as a hyperlink) to navigate to another interface that provides more information about the n-gram, the video clip in which the n-gram is uttered, etc.

Although video clips and electronic video files are described herein for obtaining dictionary usage examples, this is not meant to be limiting. Techniques described herein may be used to generate dictionary usage examples in and/or from other formats of data, such as audio files. For example, a user interacting with a display-less assistant device may nonetheless wish to learn more about a target n-gram, including hearing an audio clip of the n-gram uttered in a target context. Accordingly, techniques described herein may be employed to extract audio clips from audio files (or from video files having audio tracks), wherein the audio clips contain spoken utterances of target n-grams.

Figure 4:
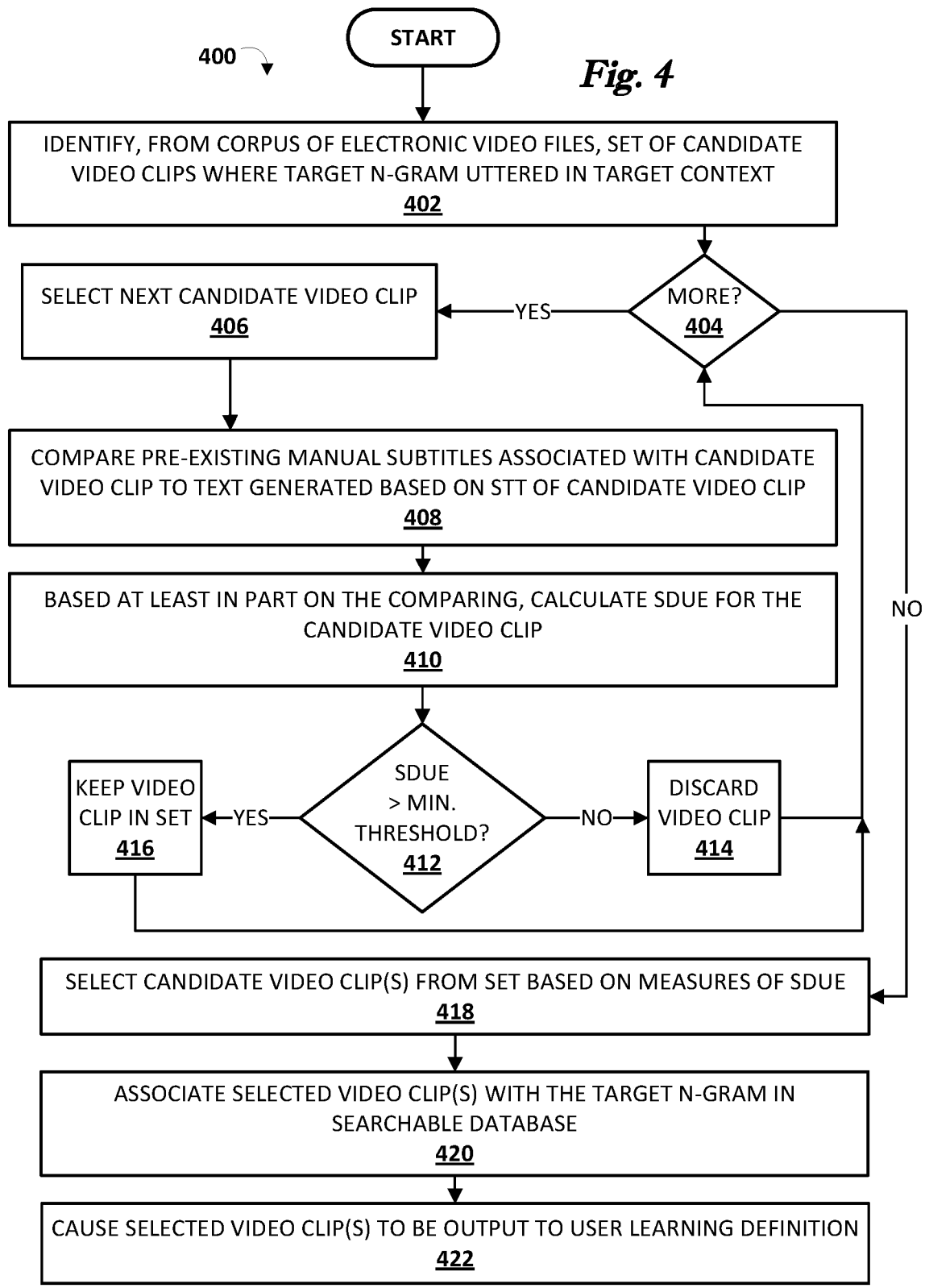
FIG. 4 depicts a flow chart illustrating an example method in accordance with various implementations.

Referring now to FIG. 4, one example method 400 for practicing various aspects of the present disclosure is described. For convenience, the operations of the flow chart are described with reference to a system that performs the operations. This system may include various components of various computer systems, including various classifiers, engines, and/or client applications described herein. Moreover, while operations of method 400 are shown in a particular order, this is not meant to be limiting. One or more operations may be reordered, omitted or added.

At block 402, the system, e.g., by way of video crawler 136, may identify, from a corpus of electronic video files such as index 144, a set of candidate video clips in which a target n-gram is uttered in a target context. These candidate video clips may be indexed in index 144 by n-grams found, for instance, in their accompanying textual data (e.g., subtitles) and/or in STT output generated from audio portions of the video clips. Accordingly, these textual data may be used, e.g., by video crawler 136, to identify the subset of candidate video clips.

In some implementations, the system may excise or extract, as video clips, portions of entire electronic video files in which a target n-gram is uttered. These portions of entire electronic video files may be identified and/or delineated—e.g., to ensure the resulting video clip includes the target n-gram being uttered as part of a complete sentence and/or with sufficient context—in various ways. In some implementations, the subtitles and/or STT output that accompanies and/or is generated from the video file may be analyzed to identify punctuation (e.g., periods, commas) or other signals (e.g., newlines in subtitles, audible pauses in spoken dialog) that signify logical breaks in spoken dialog. Various heuristics may be employed to identify signals such as textual timing, punctuation, capitalization, time of occurrence, etc., any of which can be used to excise a video clip portion that contains an utterance of a target n-gram from an electronic video file.

Referring back to FIG. 4, at block 404, the system may determine whether there are more candidate video clips in the set. If the answer is yes, then method 400 may proceed to block 406, at which point a next video clip of the set may be selected for analysis.

At block 408, the system may compare pre-existing manual subtitles associated with the selected candidate video clip to text that is generated based on speech recognition processing (i.e. STT) of an audio portion of the candidate video clip so that, at block 410, the system can calculate a measure of SDUE for the video clip. As noted previously, the text generated from STT processing may already exist for the video clip, or it may be generated as needed, e.g., as the video clip is analyzed to determine its measure of SDUE.

In various implementations, the calculation of block 408 may be further or alternatively based on other signals described herein, such as whether the speaker was facing the camera, background noise in the video clip, popularity of the video clip and/or an actor/crew member, and so forth. Other signals are contemplated herein. For example, in some implementations, video clips may be submitted by users, e.g., to dictionary engine 128, specifically to be used as dictionary usage examples. In some such implementations, the fact that a video clip was submitted by a user for this very purpose may have a positive influence on its measure of SDUE. Intuitively, video clips submitted by users specifically for use as dictionary usage examples are likely to be suitable for that use.

Additionally or alternatively, user feedback may impact a measure of SDUE calculated for a video clip. If one or more users provide positive feedback (e.g., "likes") when presented with a particular video clip as a dictionary usage example, that positive feedback may increase the strength of the measure of SDUE of that video clip moving forward. Similarly, negative feedback may decrease the video clip's measure of SDUE moving forward.

Feedback need not be explicit. Suppose multiple users watch multiple video clips of a sequence of video clips for a target n-gram, and that all those users stop watching after a particular video clip. That may suggest that the last video clip of the sequence that was watched by the users was particularly effective at teaching how the target n-gram should be used. That video clip may receive a stronger measure of SDUE moving forward, and in many cases might be promoted over (e.g., presented before) other video clips of the sequence. Likewise, if multiple users tend to watch at least one additional video clip after a particular video clip, and few or no users stop after that particular video clip, that may suggest that the particular video clip is not a suitable dictionary usage example.

At optional block 412, the system may determine whether the measure of SDUE calculated at block 410 for the selected candidate video clip satisfies some minimal threshold. If the answer is no, the selected candidate video clip may be discarded or otherwise excluded from the set at block 414, and method 400 may proceed back to block 404. However, if the answer at block 412 is yes, then at block 416, the selected candidate video clip may be kept as a candidate in the set, and method 400 may proceed back to block 404.

At block 404, if there are no more candidate video clips in the set, then at block 418, the system may select one or more of the candidate video clips from the set of candidate video clips based on their respective measures of SDUE. At block 420, the system may associate the one or more video clips selected at block 420 with the target n-gram in a searchable database, e.g., video clip index 134. In some implementations, at block 422 (which may occur, for instance, sometime later when a user seeks information about the target n-gram), the system may cause the video clips selected at block 420 to be output to the user, e.g., one after the other (FIGS. 2A-C), as a swipe-able list (FIG. 3), as audio output only, and so forth.

Figure 5:
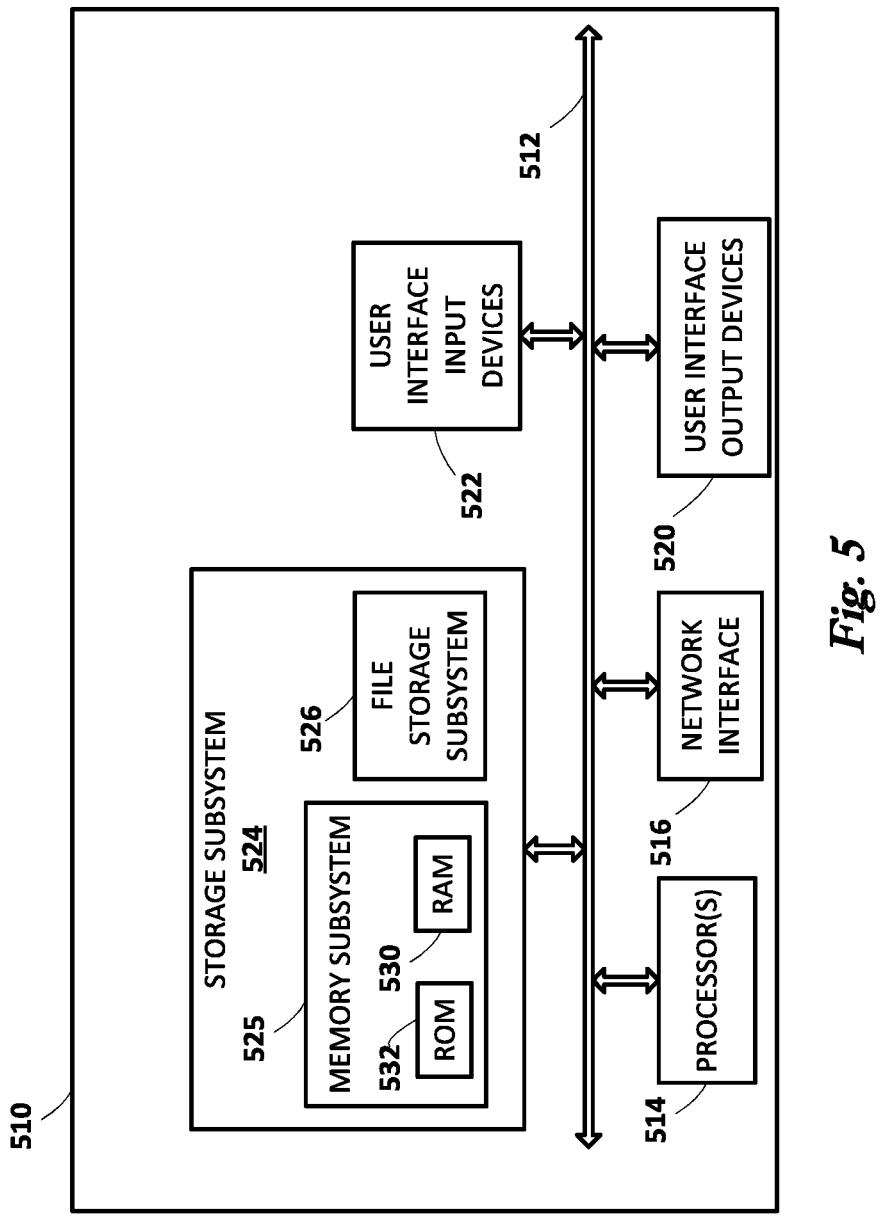
FIG. 5 schematically depicts an example architecture of a computer system.

FIG. 5 is a block diagram of an example computer system 510. Computer system 510 typically includes at least one processor 514 which communicates with a number of peripheral devices via bus subsystem 512. These peripheral devices may include a storage subsystem 526, including, for example, a memory subsystem 525 and a file storage subsystem 526, user interface output devices 520, user interface input devices 522, and a network interface subsystem 516. The input and output devices allow user interaction with computer system 510. Network interface subsystem 516 provides one or more network interfaces to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 526 stores programming and data constructs that provide the functionality of some or all of the modules described herein. For example, the storage subsystem 526 may include the logic to perform selected aspects of method 400, and/or to implement one or more components of knowledge system 102 such as video crawler 136.

These software modules are generally executed by processor 514 alone or in combination with other processors. Memory 525 used in the storage subsystem 526 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 526, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
    obtaining one or more terms, wherein the one or more terms comprise a target n-gram;
    identifying, from a corpus of electronic video files, a set of candidate video clips based on the one or more terms, wherein the target n-gram is uttered in a target context in each candidate video clip of the set;
    for each candidate video clip of the set:
        comparing pre-existing manual subtitles associated with the candidate video clip to text that is generated based on speech recognition processing of an audio portion of the candidate video clip, and
        based at least in part on the comparing, calculating a measure of suitability as a dictionary usage example for the candidate video clip based at least in part on a similarity between the pre-existing manual subtitles and the text that is generated based on speech recognition processing of the audio portion of the candidate video clip, wherein the calculating is further based on a measured speech rate of speech uttered in the candidate video clip;
    selecting one or more of the candidate video clips from the set of candidate video clips based on the measures of suitability as dictionary usage examples; and
    associating the one or more selected video clips with the target n-gram in a searchable database.

2. The method of claim 1, wherein the identifying further includes performing natural language processing on text associated with the electronic video files to identify those in which the target n-gram is uttered in the target context.

3. The method of claim 1, wherein the identifying further includes applying text embeddings generated from text associated with the electronic video files as input across a trained machine learning model to generate output, wherein the output is used to identify the set of candidate video clips in which the target n-gram is uttered in the target context.

4. The method of claim 1, wherein the calculating is further based on a detected gaze of a speaker in the candidate video clip while the speaker uttered the target n-gram in the target context.

5. The method of claim 1, wherein the calculating is further based on a detected pose of a speaker in the candidate video clip while the speaker uttered the target n-gram in the target context.

6. The method of claim 1, wherein the calculating is further based on a popularity measure of the candidate video clip.

7. The method of claim 1, wherein the calculating is further based on a determination that a given user who seeks information about the target n-gram has viewed the candidate video clip previously.

8. The method of claim 1, wherein the calculating is further based on an identity of a speaker of the target n-gram in the candidate video clip or an identity of a crew member who aided in creation of the candidate video clip.

9. The method of claim 1, wherein the calculating is further based on an accent of a speaker of the target n-gram in the candidate video clip.

10. The method of claim 1, wherein the one or more selected video clips comprise a plurality of selected video clips.

11. The method of claim 10, wherein the method further comprises causing the plurality of video clips to play as a sequence, one after another.

12. The method of claim 10, wherein the method further comprises causing a graphical user interface ("GUI") to be rendered on a client device, wherein the GUI is operable by a user to swipe through the plurality of selected video clips.

13. A system comprising one or more processors and memory storing instructions that, in response to execution of the instructions by the one or more processors, cause the one or more processors to:

obtaining one or more terms, wherein the one or more terms comprise a target n-gram;

identify, from a corpus of electronic video files, a set of candidate video clips based on the one or more terms, wherein the target n-gram is uttered in a target context in each candidate video clip of the set;

for each candidate video clip of the set:
- compare pre-existing manual subtitles associated with the candidate video clip to text that is generated based on speech recognition processing of an audio portion of the candidate video clip, and
- based at least in part on the comparison, calculate a measure of suitability as a dictionary usage example for the candidate video clip based at least in part on a similarity between the pre-existing manual subtitles and the text that is generated based on speech recognition processing of the audio portion of the candidate video clip, wherein the calculating is further based on a measured speech rate of speech uttered in the candidate video clip;

select one or more of the candidate video clips from the set of candidate video clips based on the measures of suitability as dictionary usage examples; and associate the one or more selected video clips with the target n-gram in a searchable database.

14. The system of claim 13, wherein the identifying further includes performing natural language processing on text associated with the electronic video files to identify those in which the target n-gram is uttered in the target context.

15. The system of claim 13, wherein the identifying further includes applying text embeddings generated from text associated with the electronic video files as input across a trained machine learning model to generate output, wherein the output is used to identify the set of candidate video clips in which the target n-gram is uttered in the target context.

16. The system of claim 13, wherein the calculating is further based on a detected gaze of a speaker in the candidate video clip while the speaker uttered the target n-gram in the target context.

17. The system of claim 13, wherein the calculating is further based on a detected pose of a speaker in the candidate video clip while the speaker uttered the target n-gram in the target context.

18. The system of claim 13, wherein the calculating is further based on a detected background noise level of the candidate video clip or a measured speech rate of speech uttered in the candidate video clip.

19. At least one non-transitory computer-readable medium comprising instructions that, in response to execution of the instructions by one or more processors, cause the one or more processors to perform the following operations:

obtaining one or more terms, wherein the one or more terms comprise a target n-gram;

identifying, from a corpus of electronic video files, a set of candidate video clips based on the one or more terms, wherein the target n-gram is uttered in a target context in each candidate video clip of the set;

for each candidate video clip of the set:
- comparing pre-existing manual subtitles associated with the candidate video clip to text that is generated based on speech recognition processing of an audio portion of the candidate video clip, and
- based at least in part on the comparing, calculating a measure of suitability as a dictionary usage example for the candidate video clip based at least in part on a similarity between the pre-existing manual subtitles and the text that is generated based on speech recognition processing of the audio portion of the candidate video clip, wherein the calculating is further based on a measured speech rate of speech uttered in the candidate video clip;

selecting one or more of the candidate video clips from the set of candidate video clips based on the measures of suitability as dictionary usage examples; and associating the one or more selected video clips with the target n-gram in a searchable database.

\* \* \* \* \*